Dec. 9, 1924.
A. O. ABBOTT, JR
1,518,237
FLAP MAKING MACHINE
Filed Feb. 25, 1920
3 Sheets-Sheet 2
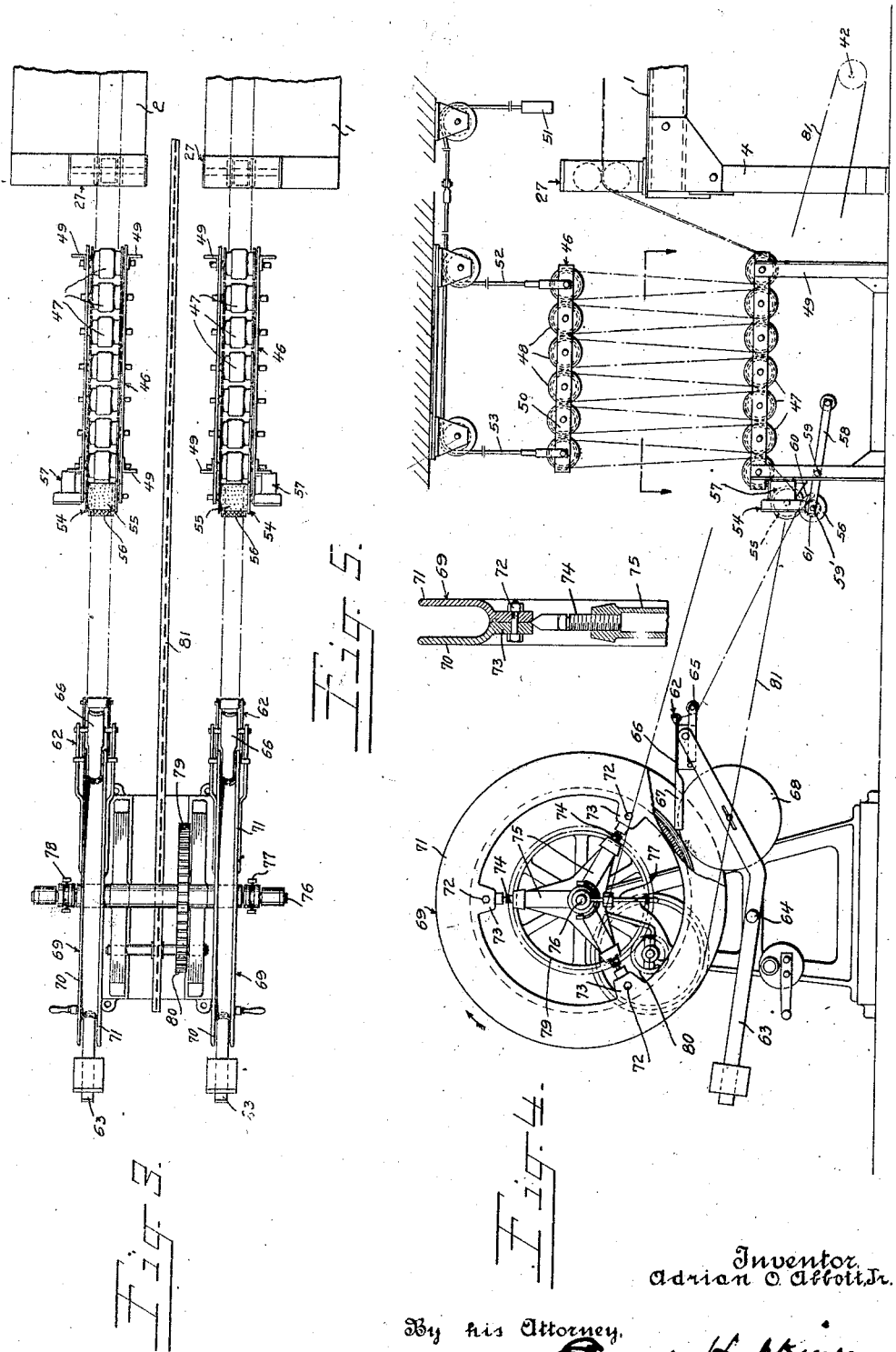
Inventor.
Adrian O. Abbott Jr.
By his Attorney,
Ernest Hopkins

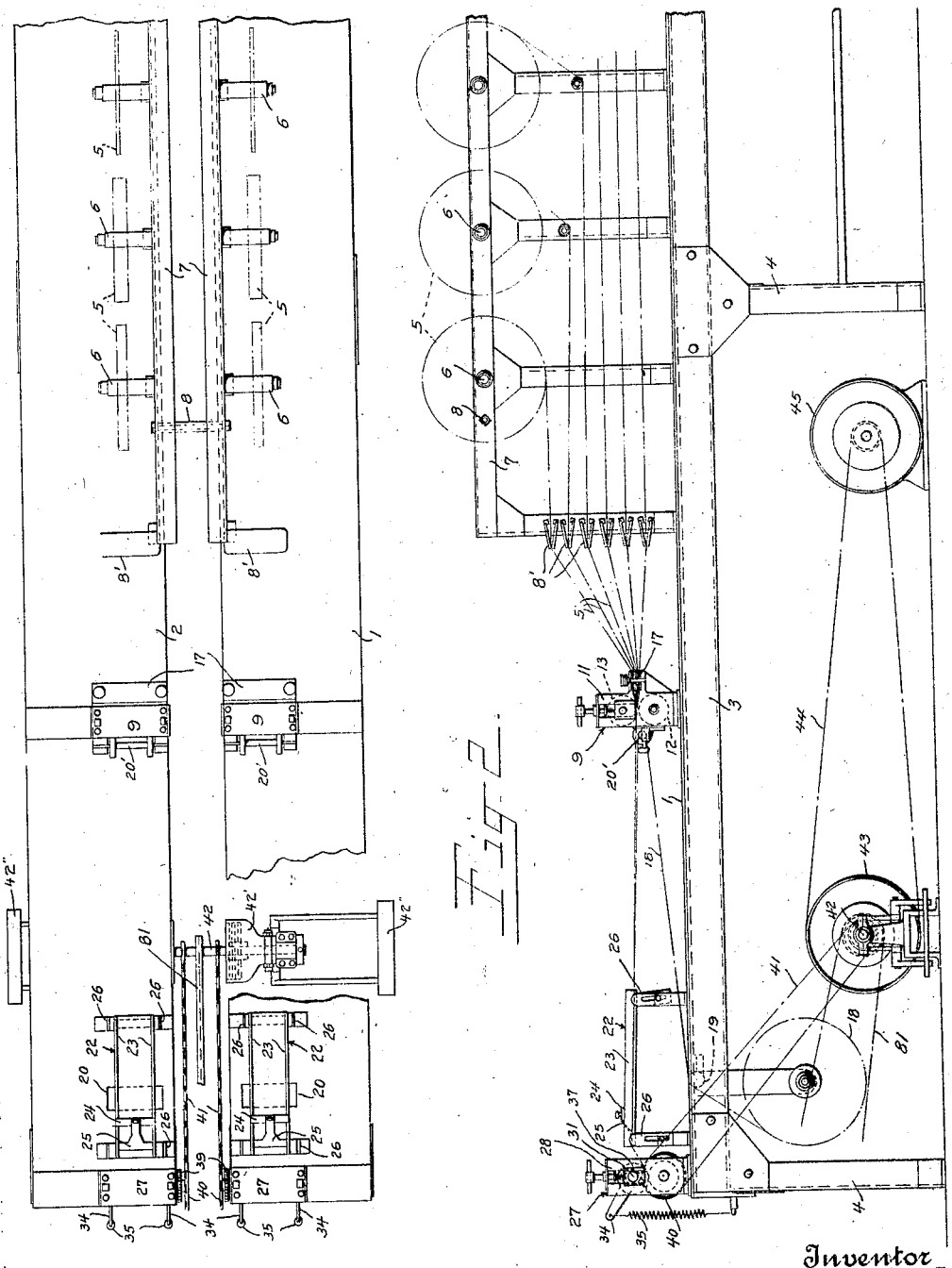

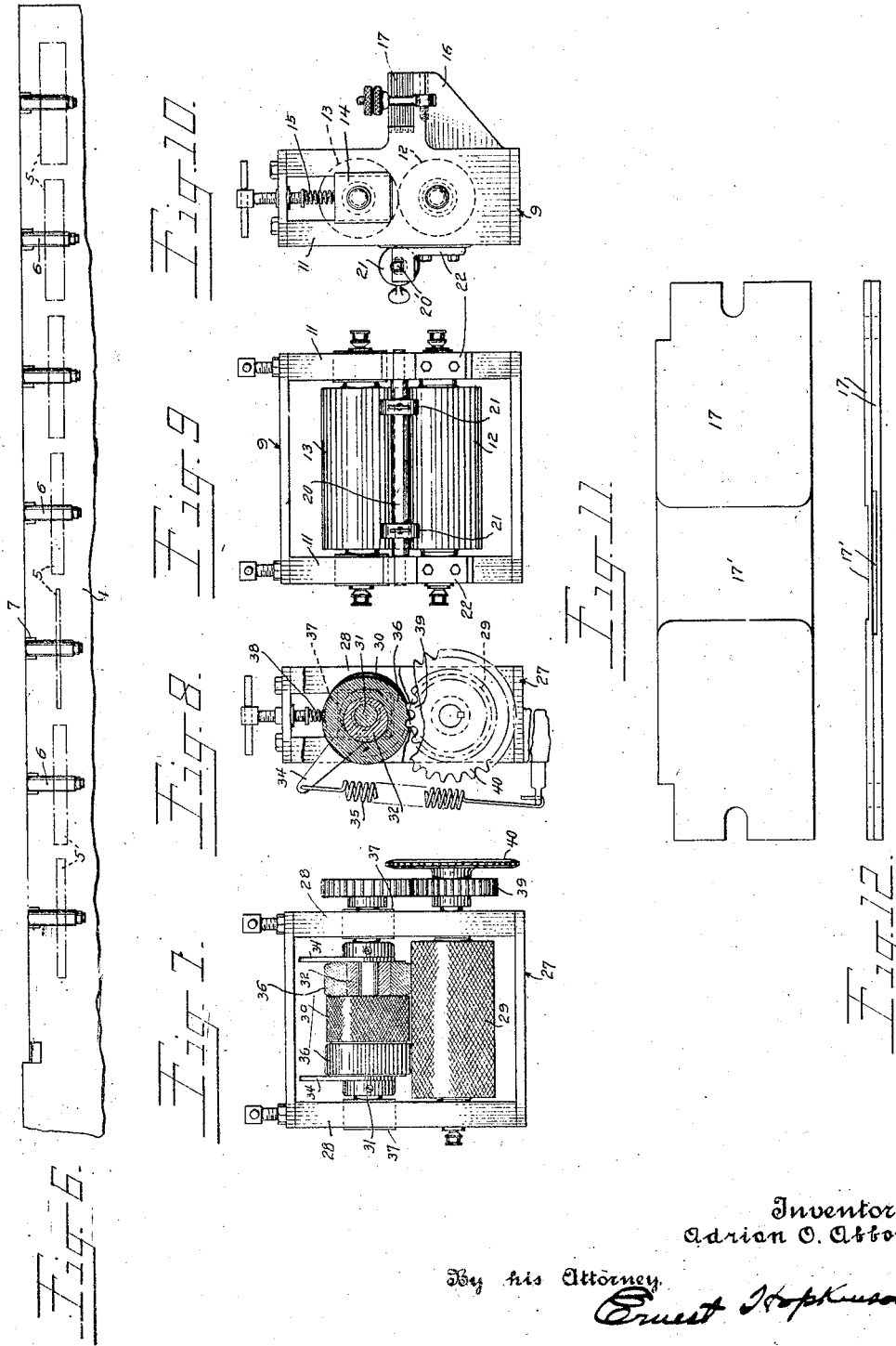

Patented Dec. 9, 1924.

1,518,237

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

FLAP-MAKING MACHINE.

Application filed February 25, 1920. Serial No. 361,177.

*To all whom it may concern:*

Be it known that I, ADRIAN O. ABBOTT, Jr., a citizen of the United States, residing at Detroit, county of Wayne, and State of Michigan, have invented certain new and useful Improvements in Flap-Making Machines, of which the following is a full, clear, and exact description.

This invention relates to a machine for making flaps for pneumatic tires.

It has for an object the creation of a duplex type of machine economizing floor space and eliminating confusion in the manufacture of tire flaps. It also aims to provide a new combination and arrangement of devices for continuously assembling a plurality of strips in superposed relation. It aims to improve certain details of machines of the same general type, particularly in the control of the several strips and in the construction of a cupping reel upon which the banded together strips are finally wound and vulcanized.

In machines for making a laminated fabric band from a plurality of strips one of which at least is folded about the edges of the others, it aims to provide improved means for ironing the folded edges smooth. It also aims to provide an improved means for folding one of the strips to a predetermined width. And finally, it has for an object a combination and organization of parts which permits of independent operation of means for assembling the strips in superposed relation and means for winding the strips on a reel whereby economy in production is effected.

Briefly described, the invention comprises means for drawing a plurality of strips from supply rolls and assembling them in superposed relation, preferably, but not necessarily, with the edges of one of the strips folded about the others, in passing the resulting laminated fabric band through an accumulating device which is adapted to store up a relatively considerable length of the band when, as is frequently the case, the operator of the assembling means has to stop his part of the machine to make or repair splices in the several strips that are being banded together and such other defects as may occur. A reel is located beyond the accumulator for continuously winding up the laminated fabric band into compact convolutions. On this reel, which is readily removable, the banded strips are vulcanized and after vulcanization readily removed for subsequent treatment by separation of its complementary annular sections.

The above are the objects of my invention but other objects thereof will appear in the following detailed description of the accompanying drawings in which:

Figure 1 is a plan view of a duplex machine showing the opposed tables on which is supported the assembling mechanism.

Figure 2 is a side elevation of the same.

Figures 3 and 4 are plan views and side elevations respectively of the duplex winding and accumulating mechanisms.

Fig. 5 is a detail in cross-section of a split reel and disengageable supporting means therefor.

Fig. 6 is a diagrammatic illustration in plan view of one of the duplex series of supply roll supports, the supply rolls being indicated in dotted lines.

Figs. 7 and 8 show in front and side elevation a set of driven pulling and pressing rolls, parts thereof being shown in section.

Figures 9 and 10 represent a set of free running auxiliary pressing rollers in front and side elevation.

Fig. 11 represents a separating guide plate in plan.

Fig. 12 shows two of the same guide plates in elevation.

In the drawings one of the many possible embodiments of the invention is illustrated mounted on parallel tables 1 and 2, each composed of longitudinal bars 3 suitably braced and sustained by legs 4.

Duplicate sets of mechanisms are supported on each table adjacent their contiguous edges and a description of one of these sets will now be given.

Each of these sets of devices constitutes collectively a means for assembling a plurality of strips in superposed relation. A plurality of supply rolls 5, preferably of frictioned fabric for the purpose of making tire flaps and of suitably varied width, are rotatably supported on spools 6 sustained by a frame 7 which is suitably fixed above the 10 table. The opposed frames 7 are rigidly sedured against excessive vibration by bolts and spacing collars one of which is indicated at 8 in Fig. 2. A plurality of pairs of opposed spring fingers 8' are provided for separately tensioning to a slight degree each individual strip in its passage to the guides 17 and prevent each strip from fouling the guides in case one or more breaks off between the fingers and rolls. The strips are positioned in spaced relation by these guides and they pass through a preliminary pressing device indicated generally at 9 and shown in detail in Figs. 9 and 10. This preliminary presser device comprises vertical standards 11 housing a pair of rollers 12 and 13 the latter of which has its bearings in slide blocks 14 which are yieldingly actuated by adjustable compression springs 15. On brackets 16 extending laterally from each of the standards 11 the plates 17 with guideways 17' are provided for directing the several strips properly in superposed relation between the presser rolls 12 and 13.

Below each of the tables 1 and 2 a roll of fabric 18, preferably canton flannel for the special purpose of making duck flaps for tires, is hung and a strip thereof is conducted from a guide member or roller 19 through a hole 20 in the table top backwardly to standards 11 on the rear side of which is a rod 20' which carries adjustable edge guiding collars 21 and is itself supported by brackets 22 suitably fixed to the standards 11.

The several strips from rolls 5 are flattened by the pressers 12 and 13, and if the material be friction fabric they are effectively stuck together, while the strip 18 is preferably frictioned on one side only and is of greater width than the several strips 5. The several friction strips 5 and 18 are conducted to a folding device indicated generally by the numeral 22 and which comprises edge guiding rails 23 supporting a cross bar 24 carrying a flexibly supported T shaped tongue 25 which compels the strip 18, to fold about its ends to a width predetermined thereby. The folder 22 is adjustably supported on slotted bracket arms 26 for facility in manipulation of the banded strips.

Adjacent the delivery end of the folder 22 a combined feeding and pressing device indicated generally by the numeral 27 is provided. As shown more fully in Figs. 7 and 8 this device comprises spaced vertical standards 28 supporting upper and lower roughened rollers 29 and 30, the latter of which is supported on the shaft 31 which on both sides of the roller 30 loosely supports eccentrics 32 rigid with arms 34 which are pulled upon by springs 35. On the eccentrics 32 presser members 36 are rotatably supported and spring pressed against or toward the lower roller 29 so as to iron smooth the folded margins of the strip 18. The shaft 31 is journaled in blocks 37 slidable in the standards 28 and pressed by the spring 38 in a direction tending to carry the roller 30 against the roller 29. The rollers 29 and 30 are each secured fast to their respective supporting shafts which are geared together as indicated at 39 and power driven in any suitable manner as through a sprocket 40 fast to one of said shafts and flexibly connected as indicated at 41, Fig. 2, to a power driven shaft 42 which extends transversely beneath the tables 1 and 2 and carries a pulley 43 belted as indicated at 44 to a motor 45 beneath the tables.

It is to be noticed that there are two independent flexible connections 41 driving each of the pulling and pressure applying devices 27. These devices 27 pull all the strips of fabric from their several supply stations and it is desirable at times to halt their operation in order to remedy defects in the strips passing thereto, such for instance, as making or repairing splices. For the purpose, therefore, of stopping the operation of the assembling mechanism above described whenever desirable, a convenient treadle operable clutch mechanism is provided between the shaft 42 and the flexible connections 41 to each of the presser devices. Any suitable clutch mechanism may be employed for this purpose, a satisfactory form thereof being illustrated conventionally at 42' in Figs. 1 and 2 and by treadles 42'' at the side of each table. Either clutch may be operated at will.

Referring to Figs. 3 and 4 the band of laminated fabric formed by assembling in superposed relation the several strips 5 and 18, is conducted from the pulling pressers 27 through an accumulating device indicated generally by the numeral 46, thence through a measuring device indicated generally by the numeral 54 thence through a counting mechanism indicated generally by the numeral 57 and finally to a cupping reel indicated generally by the numeral 69.

The accumulator 46 comprises spaced series of crowned pulleys 47 and 48 the former being rotatably mounted in a stationary frame 49 and the latter being shiftably supported by a floating frame 50 which is counterbalanced by a suitable weight 51 flexibly connected therewith as indicated at 52 and 53. A composite band is passed back and forth over the pulleys 47 and 48 in the manner illustrated and frame 50 shifts up or down to accommodate the differences in the rate of operation of the assembling means and of the winding up mechanism. Within the limits of the accumulator's capacity the assembling mechanism or the winding up mechanism may either remain idle while the other is operating, thus independent operation of either is permitted and the operators of the two mechanisms may continue their work without interruption while one is temporarily halted repairing the splices or removing a filled reel. It is to be noted that the several pulleys 47 and 48 have a crown portion of less width than the composite band which has been found essential to the successful operation of the accumulator. The relatively narrow crown faces prevent the band from running off the pulleys.

The measuring device 54 is suitably supported adjacent the delivery end of the accumulator and comprises pin-studded rollers 55 and 56 of a certain size the former being coupled up to a counting device indicated generally by the numeral 57. Preferably a pawl and ratchet mechanism is provided to prevent backward movement of the band. This mechanism comprises a weighted lever 58 fulcrumed at 59 on the frame 49 and carrying the roller 56 and a pawl 60 which co-operates with a ratchet wheel 61 fixed to the shaft 59' of the pulley 56.

The composite band then passes to a cupping guide indicated generally at 62, the several parts of which are carried by a lever 63 fulcrumed at 64. The instrumentalities for cupping the band transversely, i. e., curving it in cross-section, comprises a guide roller 65 under which the band is led and from which it passes over a sheet metal plate 66 which is bent into a downwardly concave form at the end thereof adjacent the reel as indicated at 67, where it partly embraces a convexly surfaced roller 68. All of the instrumentalities above mentioned are suitably supported on the lever 63 which holds the roller 68 in frictional driving relation with the cupping reel 69.

There are, of course, two cupping reels 69 and each of them is made of complementary split annular sections 70 and 71 which are bolted together as indicated at 72. The bolts 72 pass through inwardly directed lugs 73 which are adapted to have threaded arms 74 thrust thereagainst for the convenient removal and replacement of the reels. The threaded arms 74 are carried by chucks 75 which are loosely sleeved on a shaft 76 provided at its opposite ends with suitable clutches 77 and 78 for coupling either chuck to the shaft 76. The shaft 76 is constantly driven through the gears 79 and 80 which in turn are driven through the belt or other flexible connection 81 from the shaft 42 before-mentioned.

While the foregoing describes a preferred embodiment of the invention, it will be understood that the principles thereof may be incorporated in various forms and, therefore, reference should be made to the claims for an understanding of the scope of the invention.

Having thus described my invention what I claim and desire to protect by Letters Patent is:

1. In a duplex machine for making a band of laminated fabric strips, in combination, two independent series of strip supplying rollers, means for drawing said strips from their supply rollers and pressing them together, a pair of reels, a pair of accumulating devices in advance of said reels and means for rotating said reels including a driven shaft axially supporting the reels, and independently operable clutching mechanism for driving either therefrom at will.

2. In a machine for making bands of laminated fabric, in combination, means for assembling a plurality of strips of fabric at least some of which are surfaced with an adhesive, means for folding about the edges of the laminated strips another strip which is non-adhesive on one surface at least, shiftable means in which the band may be accumulated, means beyond the shiftable means for reeling the laminated strips in a compact curved condition, and means for stopping the operation of either the reeling means or the strip assembling means while permitting the other to operate in conjunction with the shiftable accumulating means.

3. In a machine for making a laminated band from a plurality of superposed plies of fabric, in combination, means for assembling a plurality of strips in superposed relation to form a band with one of said strips folded about the edges of the others, and a pressure device having eccentric and concentric roller portions for ironing the folded edges flat.

4. In a machine for making a laminated band from a plurality of superposed plies of fabric, in combination, means for assembling a plurality of strips in superposed relation to form a band with one of said strips folded about the edges of the others, means for applying a differential pressure to the edge and intermediate portions of the composite band, and means for winding the band in a transversely curved condition in compact nested convolutions.

5. In a machine for making a laminated band from a plurality of superposed plies of fabric, in combination, means for assembling a plurality of strips in superposed relation to form a band with one of said strips folded about the edges of the others, a pressure device having eccentric and concentric roller portions for ironing the edge-folded strip flat, and means for winding the band in a transversely curved shape and in compact convolutions.

6. In a machine for making a laminated band from a plurality of superposed plies of fabric, in combination, means for assembling a plurality of strips in superposed relation to form a band with one of said strips folded about the edges of the others, and a pair of pressure feeding rollers one of which is flanked by eccentrically supported and yieldingly actuated pressure applying members cooperating with the other roller.

7. In a machine for making a laminated band from a plurality of superposed plies of fabric, in combination, means for assembling a plurality of strips in superposed relation to form a band with one of said strips folded about the edges of the others, a pair of pressure feeding rollers one of which is flanked by eccentrically supported and yieldingly actuated pressure applying members, and means for winding the band in compact convolutions each of which is curved transversely.

8. In a machine for making a laminated band from a plurality of superposed plies of fabric, in combination, means for assembling a plurality of strips in superposed relation to form a band with one of said strips folded about the edges of the others, a pair of pressure feeding rollers one of which is flanked by eccentrically supported and yieldingly actuated pressure applying members, and means for winding the band in compact convolutions.

9. A festooning rack comprising a series of rollers, a movable frame, a second series of rollers journaled in said movable frame, and means for maintaining the two said series in substantially the same angular relation while one of said series is moved from or toward the other.

10. A festooning rack comprising a stationary frame, a series of rollers journaled in said frame, a movable frame, a series of rollers journaled in said movable frame, and a weight so connected with said movable frame as to maintain the latter in substantially constant angular relation to said stationary frame while said movable frame moves from and toward said stationary frame.

Signed at Detroit, Michigan, this 17th day of February, 1920.

ADRIAN O. ABBOTT, Jr.